(12) United States Patent
Meiyappan et al.

(10) Patent No.: US 12,052,778 B2
(45) Date of Patent: Jul. 30, 2024

(54) PAIRING A TARGET DEVICE WITH A SOURCE DEVICE AND PAIRING THE TARGET DEVICE WITH A PARTNER DEVICE

(71) Applicant: BOSE CORPORATION, Framingham, MA (US)

(72) Inventors: Somasundaram Meiyappan, Chennai (IN); Santiago Carvajal, Ashland, MA (US); Eugene Zarkhin, Hudson, MA (US)

(73) Assignee: BOSE CORPORATION, Framingham, MA (US)

( * ) Notice: Subject to any disclaimer, the term of this patent is extended or adjusted under 35 U.S.C. 154(b) by 136 days.

(21) Appl. No.: 17/393,545

(22) Filed: Aug. 4, 2021

(65) Prior Publication Data
US 2023/0039812 A1    Feb. 9, 2023

(51) Int. Cl.
*H04W 76/14*    (2018.01)
*H04W 4/029*    (2018.01)
*H04W 4/80*    (2018.01)
*H04W 8/00*    (2009.01)
*H04W 76/15*    (2018.01)

(52) U.S. Cl.
CPC .......... *H04W 76/14* (2018.02); *H04W 4/029* (2018.02); *H04W 4/80* (2018.02); *H04W 8/005* (2013.01); *H04W 76/15* (2018.02)

(58) Field of Classification Search
CPC ....... H04W 76/14; H04W 4/029; H04W 4/80; H04W 8/005; H04W 76/15; H04W 88/04; H04W 40/246; H04W 84/18

USPC ........................................................ 455/41.1
See application file for complete search history.

(56) References Cited

U.S. PATENT DOCUMENTS

| | | | |
|---|---|---|---|
| 2012/0304086 A1* | 11/2012 | Molander | G06F 3/04886 715/764 |
| 2017/0099597 A1* | 4/2017 | Choi | H04W 8/005 |
| 2017/0272270 A1* | 9/2017 | Gu | H04B 17/318 |
| 2019/0044745 A1* | 2/2019 | Knudson | H04L 12/282 |
| 2019/0174557 A1 | 6/2019 | Ueda et al. | |

(Continued)

OTHER PUBLICATIONS

International Search Report and Written Opinion for International Application No. PCT/US2022/036478 Mailed Oct. 14, 2022.

*Primary Examiner* — Eugene Yun
(74) *Attorney, Agent, or Firm* — Patterson + Sheridan, LLP

(57) ABSTRACT

Processes, methods, systems, and devices are disclosed for pairing a target device with a source device and pairing the target device with a partner device. A user may choose between using the target device and the partner device without actively connecting the partner device to the source device. The target device and the partner device may each be a specialized device providing certain functions. For example, the source device may be a computing device, such as a smart phone or a tablet computer. The target device may be a sound bar dedicated for playing high definition surround sound that outperforms internal speakers of the source device. And the partner device may be a noise-canceling headset. The user may want to seamlessly switch between playing sounds on the sound bar and the headset from time to time under different circumstances, without needing to manually pair the headset to the computing device.

20 Claims, 5 Drawing Sheets

(56) References Cited

U.S. PATENT DOCUMENTS

| | | | | |
|---|---|---|---|---|
| 2019/0188891 A1* | 6/2019 | Kamini | ................... | G06T 11/60 |
| 2019/0320309 A1* | 10/2019 | Carlson | ................... | H04W 4/80 |
| 2020/0084722 A1* | 3/2020 | Yoshimori | ............ | G06F 1/3234 |
| 2020/0128620 A1* | 4/2020 | Han | ..................... | H04W 76/15 |
| 2020/0382930 A1* | 12/2020 | Zheng | ................ | H04W 52/383 |

* cited by examiner

PAIRING A TARGET DEVICE WITH A SOURCE DEVICE AND PAIRING THE TARGET DEVICE WITH A PARTNER DEVICE

FIELD

Aspects of the disclosure generally relate to wireless communication, and more specifically to a Bluetooth communication between devices.

BACKGROUND

Specialized devices are used to playback audio (and other media) content for particular functions. For example, although integrated devices such as smart phones, tablet computers, laptop computers, or televisions have internal speakers of their own, due to privacy, sound quality, and other reasons, separate dedicated speakers may be used along with the integrated devices. A user may use ear buds to avoid disturbing others or to protect privacy. A user may use a sound bar or multiple surround sound speakers to achieve theatrical sound effects. A user may use a smart speaker that recognizes voice input to interact with online content. A user may use a portable (e.g., battery powered) speaker to play sound in a different environment, such as outdoor, or in a separate room.

Very often, the integrated device may be wirelessly connected to one of such specialized devices, such as when connected to a common wireless network as the integrated device or when paired with the integrated device via a nearfield communication network, such as Bluetooth. Bluetooth is a wireless communication technology standard for exchanging data between fixed or mobile devices over short distances. In order to use the Bluetooth protocol, a device is often compatible with the subset of Bluetooth profiles (often called services) necessary to use the desired services. A Bluetooth profile is a specification regarding an aspect of Bluetooth-based wireless communication between devices.

Because specialized devices offer niche features, when a user wants to change to a different specialized device, for example for a different niche feature, a new connection is needed. Setting up this new connection may be time-consuming, troublesome, and discouraging. Accordingly, methods for a smooth transition between two or more specialized devices, as well as apparatuses and systems configured to implement these methods are desired.

SUMMARY

All examples and features mentioned herein can be combined in any technically possible manner.

Aspects of the present disclosure provide a method performed by a target device for establishing wireless communications with other devices. The method includes receiving, at the target device, a user input to enter a preparation mode. The method includes presenting, to a source device, that the target device is a discoverable device in the preparation mode, wherein the source device is operable to pair with the target device for wireless communications. The method includes scanning, by the target device, for a partner device. Upon detecting at least one partner device, the target device initiates a near-field communication network and pairs with the at least one partner device in the near-field communication network.

In aspects, the scanning by the target device for the partner device includes performing the scanning according to Bluetooth Low Energy protocols.

In aspects, the user input is associated with a movement of the user. For example, the movement of the user may contact the target device, such as for providing an input by activating a control button, by vibration, or by other tactile interactions. In some cases, the user may provide the input via non-contact methods, such as by using a gesture on an image sensor, changing light on a light sensor, or changing motion on an infrared sensor. In some cases, the user may provide the input via a remote control. In some cases, the user may provide the input via the source device that is already paired with the target device.

In aspects, the partner device is configured to enter a discoverable mode to be scanned by the target device. The partner device may enter the discoverable mode in response to a similar user input, such as an input associated with a movement of the user. Similar to the interaction with the target device, the movement of the user may contact the partner device, such as for providing an input by activating a control button, by vibration, or by other tactile interactions. In some cases, the user may provide the input via non-contact methods, such as by using a gesture on an image sensor, changing light on a light sensor, or changing motion on an infrared sensor. In some cases, the user may provide the input via a remote control. In some cases, the user may provide the input via the source device that is already paired with the partner device.

In aspects, the target device terminates the scanning when no partner device is detected within a timeout period. For example, the timeout period may be one minute, five minutes, or any preconfigured duration.

In aspects, upon detecting two or more partner devices, the target device determines which one or more of the two or more partner devices is to be paired, based on properties of the two or more partner devices provided to the target device during the detection. For example, the properties of the two or more partner devices include functionalities associated with sound playing or sound sampling. When the target device is a surround sound speaker, and the target device has detected two partner devices, one being a noise-cancelling headset, the other being a microphone, the target device may be paired with the noise-cancelling headset base on similar sound playback functionalities. In some cases, the target device may use distance indicators, such as received signal strength indicator (RSSI) normalized with antenna gains of known partner devices for determining relative distances of two or more partner devices. The target device may then choose to pair with one that has the closest distance.

In aspects, pairing with the at least one partner device in the near-field communication network includes transmitting information received from the source device when the target device and the source device are paired. For example, the information transmitted may include data the target device received from the source device, such as when the source device provides data source for playing back at the target device and/or the partner device. In some cases, the target device and the source device have previously been paired prior to the target device entering the preparation mode.

In aspects, the target device ceases to be in a discoverable state upon detecting the at least one partner device, and becomes an initiator operable to pair with the at least one partner device. For example, prior to detecting the at least one partner device, the target device may be in a pairing mode, discoverable mode, or an acceptor mode, such as according to the classic Bluetooth protocols. The target device may scan for a partner device according to Bluetooth Low Energy protocols in parallel to being in the pairing mode of the classic Bluetooth protocols. Once having detected the at least one partner device, the target device switches into an initiator mode, in order to establish a connection with the at least one partner device.

Aspects of the present disclosure provide a method performed by a user device for establishing wireless communications between at least two devices. The method generally includes running, on the user device, a monitoring application configured to monitor a connection status between the user device and a first device. The method includes identifying, by the user device, a second device available to be connected with the first device in a near-field communication network. The method further includes notifying a user regarding the second device and associated availability for connection with the first device, and providing, based on a response of the user to the notification, at least one feedback instruction to the first device regarding the availability for connection of the second device.

In aspects, the user device monitors a received signal strength indicator (RSSI) reported by the first device and notifies the user when the RSSI reported drops below a threshold value.

In aspects, the user device identifies the second device by receiving, from the first device, a detection report by the first device of the second device. For example, the first device may scan for the second device absent user input. In some cases, the first device may scan for the second device using Bluetooth Low Energy protocols.

In aspects, the user device provides, upon receiving an approval response from the user, a number of options regarding a timeout period for the connection between the first device and the second device for user selection. In some cases, the number of options includes a permanent pairing option.

In aspects, the second device is triggered by the user to be available to be connected with the first device.

In aspects, the user device plays media content on the second device after the first device has been connected with the second device.

Two or more features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

BRIEF DESCRIPTION OF THE DRAWINGS

Like numerals indicate like elements.

DETAILED DESCRIPTION

Figure 1:
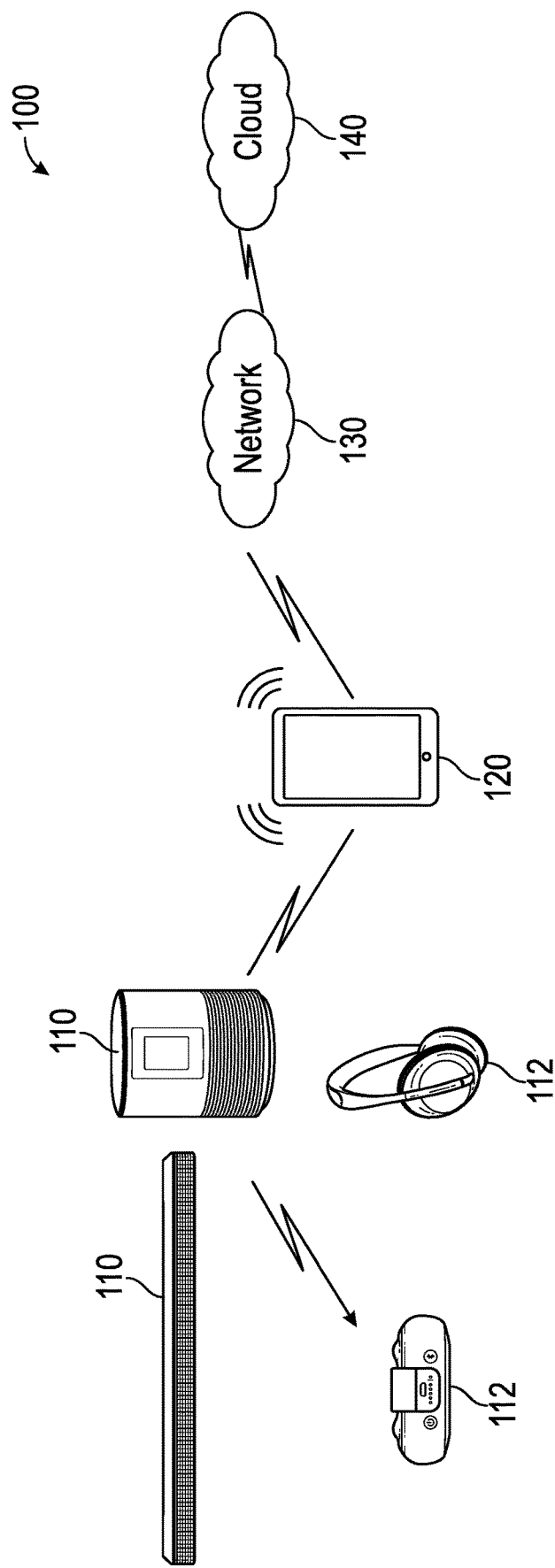
FIG. 1 illustrates an example system in which aspects of the present disclosure may be implemented.

The present disclosure provides processes, methods, systems, and devices for pairing a target device with a source device and pairing the target device with a partner device. This way, a user may choose between using the target device and the partner device without actively connecting the partner device to the source device. The target device and the partner device may each be a specialized device providing certain functions. For example, the source device may be a computing device, such as a smart phone or a tablet computer. The target device may be a sound bar dedicated for playing high definition surround sound that outperforms internal speakers of the source device. In an example, the partner device may be a noise-canceling headset. The user may want to seamlessly switch between playing sounds on the sound bar and the headset from time to time under different circumstances, without wanting to manually pair the headset to the computing device.

In an example, the target device may be paired with the source device via a nearfield communication network. The target device may scan for a partner device. Upon detecting at least one partner device, the target device may initiate another nearfield communication network to pair with the at least one partner device. In some cases, scanning for the partner device may be triggered by receiving an input from a user to enter a preparation mode. Upon entering the preparation mode, the target device may present itself in a discoverable state to enable the source device (or another source device) to pair with the target device in the nearfield communication network. In this way, the target device may switch between, or simultaneously behave as, an acceptor to the source device and an initiator to the partner device. The target device may relay signals received from the source device to the partner device, allowing the user to use the partner device instead of the target device.

In aspects, the user may use a user's device with a software application ("application") executed thereon to interact with the target device and the partner device. For example, a monitoring application may be running in the user device for monitoring a connection status between the user device and the first device. The user device may identify one or more partner devices available to be connected with the target device in a near-field communication network. The user device notifies the user regarding the one or more partner devices and associated availability for connection with the target device. The user device then provides, based on a response to the notification, at least one feedback instruction to the target device regarding the availability for connection of the second device.

The present disclosure provides benefits of establishing near-field communications among capable devices with minimal user input. Very often, users may find configuring devices for wireless communications tedious and troublesome. In existing practices, establishing new connections, though beneficial, may seemingly consume too much time or effort. The disclosed systems and methods enable the user to activate multiple devices with a single input (e.g., per device) or a single action configuration on the monitoring application. By allowing a target device to switch from one role (i.e., an acceptor) to another (i.e., an initiator), the pairing operations in near-field network can be performed without much user involvement. The simplification of the pairing procedure may encourage the user to identify and use a most suitable device for particular functions.

FIG. 1 illustrates an example system 100 in which aspects of the present disclosure are practiced. As shown, system 100 includes a target device 110 (two examples for the target device 110 are illustrated, including a sound bar and a smart speaker) communicatively coupled with a source device 120 (e.g., a computing device or user device, such as a smartphone, tablet computer, or the like). One or more partner devices 112 (two examples for the partner device 112 are illustrated, including a portable speaker and a headset) may be available to accept pairing requests from the target device 110 or the source device 120. The target device 110 may be paired with the source device and receive content data from the source device. The partner device 112 may be a battery powered portable device suitable for mobile or privacy applications, such as for outdoor or Do-Not-Disturb situations.

Although the target device 110 and the one or more partner devices 112 may both be capable of being directly paired with the source device 120 in a near-field network environment, such pairing often requires active user involvement. For example, a user would be required to search for available devices on the source device 120 and assign specific pairing functions (e.g., phone calls, music playback, etc.) to specific available devices. Multiple steps are needed to pair available devices to the source device, including the steps needed to prepare the available devices for connection to the source device. Further, the pairing procedure takes time, often minutes (due to delay in hardware responses, such as for obtaining pairing confirmations). The time and effort may prevent a user from attempting to switch between the target devices 110 and partner devices 112 even though specific functions could be utilized by switching between available devices.

The present disclosure streamlines the procedure for the user to effortlessly use any one of the target device(s) 110 and/or partner devices 112 with minimal time delay (i.e., no waiting time due to hardware response delay). For example, a user may only need to initiate, by performing one activation indication, a partner device 112 for the partner device 112 to automatically pair with the target device 110 and receive content data from the source device 120. To perform the single activation indication, the user may press on a hardware button on the partner device 112, press on a hardware button on a remote of the partner device 112 or the target device 110, or accept a notification on the source device 120, such as via an application interface.

The target device 110 and the partner device 112 may respectively further include hardware and circuitry including processor(s)/processing system and memory configured to implement one or more sound management capabilities or other capabilities including, but not limited to, noise cancelling circuitry (not shown) and/or noise masking circuitry (not shown), body movement detecting devices/sensors and circuitry (e.g., one or more accelerometers, one or more gyroscopes, one or more magnetometers, etc.), geolocation circuitry and other sound processing circuitry.

In an aspect, the target device 110 is wirelessly connected to the source device 120 using one or more wireless communication methods including, but not limited to, Bluetooth, Wi-Fi, Bluetooth Low Energy (BLE), other RF-based techniques, or the like. In an aspect, the target device 110 includes a transceiver that transmits and receives data via one or more antennae in order to exchange audio data and other information with the source device 120.

In an aspect, the target device 110 includes communication circuitry capable of transmitting and receiving audio data and other information from the source device 120. The target device 110 also includes an incoming audio buffer, such as a render buffer, that buffers at least a portion of an incoming audio signal (e.g., audio packets) in order to allow time for retransmissions of any missed or dropped data packets from the source device 120. For example, when the target device 110 receives Bluetooth transmissions from the source device 120, the communication circuitry typically buffers at least a portion of the incoming audio data in the render buffer before the audio is actually rendered and output as audio to at least one of the transducers (e.g., audio speakers) of the target device 110. This is done to ensure that even if there are RF collisions that cause audio packets to be lost during transmission, that there is time for the lost audio packets to be retransmitted by the source device 120 before they have to be rendered by the target device 110 for output by one or more acoustic transducers of the target device 110.

One example of the partner device 112 is shown as noise-canceling headphones; however, the techniques described herein apply to other wireless audio devices, such as wearable audio devices, including any audio output device that fits around, on, in, or near an ear (including open-ear audio devices worn on the head or shoulders of a user) or other body parts of a user, such as head or neck. The partner device 112 may take any form, wearable or otherwise, including standalone alone devices (including automobile speaker system), stationary devices (including portable devices, such as battery powered portable speakers), headphones, earphones, earpieces, headsets, goggles, headbands, earbuds, armbands, sport headphones, neckband, or eyeglasses.

In an aspect, the target device 110 is connected to the source device 120 using a wired connection, with or without a corresponding wireless connection. The source device 120 can be a smartphone, a tablet computer, a laptop computer, a digital camera, or other user device that connects with the target device 110. As shown, the source device 120 can be connected to a network 130 (e.g., the Internet) and can access one or more services over the network. As shown, these services can include one or more cloud services 140.

In an aspect, the source device 120 can access a cloud server in the cloud 140 over the network 130 using a mobile web browser or a local software application or "app" executed on the source device 120. In an aspect, the software application or "app" is a local application that is installed and runs locally on the source device 120. In an aspect, a cloud server accessible on the cloud 140 includes one or more cloud applications that are run on the cloud server. The cloud application can be accessed and run by the source device 120. For example, the cloud application can generate web pages that are rendered by the mobile web browser on the source device 120. In an aspect, a mobile software application installed on the source device 120 or a cloud application installed on a cloud server, individually or in combination, may be used to implement the techniques for low latency Bluetooth communication between the source device 120 and the target device 110 in accordance with aspects of the present disclosure. In an aspect, examples of the local software application and the cloud application include a gaming application, an audio AR application, and/or a gaming application with audio AR capabilities. The source device 120 may receive signals (e.g., data and controls) from the target device 110 and send signals to the target device 110.

An example target device 110 or the partner device 112 may include components (not shown in FIG. 1) described below. For example, the target device 110 or the partner device 112 may each include one or more processors, memory modules, communication modules, and/or input interfaces for receiving user input. The target device 110 or the partner device 112 may each include one or more electro-acoustic transducers (or speakers) for outputting audio. The target device 110 also includes a user input interface. The user input interface can include a plurality of preset indicators, which can be hardware buttons. The preset indicators can provide the user with easy, one press access to entities assigned to those buttons. The assigned entities can be associated with different ones of the digital audio sources such that a single target device 110 can provide for single press access to various different digital audio sources.

The target device 110 or the partner device 112 may inherently include an acoustic driver or speaker to transduce audio signals to acoustic energy through the audio hardware. The target device 110 also includes a network interface, at least one processor, audio hardware, power supplies for powering the various components of the target device 110, and memory. In an aspect, the processor, the network interface, the power supplies, and the memory are interconnected using various buses, and several of the components can be mounted on a common motherboard or in other manners as appropriate. In some cases, the target device 110 or the partner device 112 may include an enclosure that houses an optional graphical interface (e.g., an OLED display) which can provide the user with information regarding currently playing ("Now Playing") music.

A network interface may provide communication between the target device 110 and other electronic user devices, such as the source device 120 and the partner device 112, via one or more communications protocols, such as Bluetooth classic protocol, Bluetooth low energy protocol, and others. In general, the network interface provides either or both of a wireless network interface and a wired interface (optional). The wireless interface allows the target device 110 to communicate wirelessly with other devices in accordance with a wireless communication protocol such as IEEE 802.11. The wired interface provides network interface functions via a wired (e.g., Ethernet) connection for reliability and fast transfer rate, for example, used when the target device 110 is not worn by a user.

In certain aspects, the network interface includes a network media processor for supporting Apple AirPlay® and/or Apple Airplay® 2. For example, if a user connects an AirPlay® or Apple Airplay® 2 enabled device, such as an iPhone or iPad device, to the network, the user can then stream music to the network connected audio playback devices via Apple AirPlay® or Apple Airplay® 2. Notably, the audio playback device can support audio-streaming via AirPlay®, Apple Airplay® 2 and/or DLNA's UPnP protocols, and all integrated within one device.

All other digital audio received as part of network packets may pass straight from the network media processor through a USB bridge (not shown) to the processor and runs into the decoders, DSP, and eventually is played back (rendered) via the electro-acoustic transducer(s).

The network interface can further include a Bluetooth circuitry for Bluetooth applications (e.g., for wireless communication with a Bluetooth enabled audio source such as a smartphone or tablet) or other Bluetooth enabled speaker packages. In some aspects, the Bluetooth circuitry may be the primary network interface due to energy constraints. For example, the network interface may use the Bluetooth circuitry solely for mobile applications when the target device 110 or the partner device 112 adopts any wearable form. For example, BLE technologies may be used in the target device 110 or the partner device 112 to extend battery life, reduce package weight, and provide high quality performance without other backup or alternative network interfaces.

In an aspect, the network interface supports communication with other devices using multiple communication protocols simultaneously at one time. For instance, the target device 110 can support Wi-Fi/Bluetooth coexistence and can support simultaneous communication using both Wi-Fi and Bluetooth protocols at one time. For example, the target device 110 can receive an audio stream from a smart phone using Bluetooth and can further simultaneously redistribute the audio stream to one or more other devices over Wi-Fi. In an aspect, the network interface may include only one RF chain capable of communicating using only one communication method (e.g., Wi-Fi or Bluetooth) at one time. In this context, the network interface may simultaneously support Wi-Fi and Bluetooth communications by time-sharing the single RF chain between Wi-Fi and Bluetooth, for example, according to a time division multiplexing (TDM) pattern.

Streamed data may pass from the network interface to the processor. The processor can execute instructions (e.g., for performing, among other things, digital signal processing, decoding, and equalization functions), including instructions stored in the memory. The processor can be implemented as a chipset of chips that includes separate and multiple analog and digital processors. The processor can provide, for example, for coordination of other components of the audio target device 110, such as control of user interfaces.

A memory may store software/firmware related to protocols and versions thereof used by the target device 110 or the partner device 112 for communicating with other networked devices, including the source device 120. For example, the software/firmware governs how the target device 110 communicates with other devices for synchronized playback of audio. In an aspect, the software/firmware includes lower level frame protocols related to control path management and audio path management. The protocols related to control path management generally include protocols used for exchanging messages between speakers. The protocols related to audio path management generally include protocols used for clock synchronization, audio distribution/frame synchronization, audio decoder/time alignment, and playback of an audio stream. In an aspect, the memory can also store various codecs supported by the speaker package for audio playback of respective media formats. In an aspect, the software/firmware stored in the memory can be accessible and executable by the processor for synchronized playback of audio with other networked speaker packages.

In aspects, the protocols stored in the memory may include BLE according to, for example, the Bluetooth Core Specification Version 5.2 (BT5.2). The target device 110 or the partner device 112, and the various components therein, are provided herein to sufficiently comply with or perform aspects of the protocols and the associated specifications. For example, BT5.2 includes enhanced attribute protocol (EATT) that supports concurrent transactions. A new L2CAP mode is defined to support EATT. As such, the target device 110 includes hardware and software components sufficiently to support the specifications and modes of operations of BT5.2, even if not expressly illustrated or discussed in this disclosure. For example, the target device 110 may utilize LE Isochronous Channels specified in BT5.2.

The processor may provide a processed digital audio signal to the audio hardware which includes one or more digital-to-analog (D/A) converters for converting the digital audio signal to an analog audio signal. The audio hardware also includes one or more amplifiers which provide amplified analog audio signals to the electroacoustic transducer(s) for sound output. In addition, the audio hardware can include circuitry for processing analog input signals to provide digital audio signals for sharing with other devices, for example, other speaker packages for synchronized output of the digital audio.

The memory can include, for example, any non-transitory memory such as flash memory and/or non-volatile random access memory (NVRAM). In some aspects, instructions (e.g., software) are stored in an information carrier. The instructions, when executed by one or more processing devices (e.g., the processor), perform one or more processes, such as those described elsewhere herein. The instructions can also be stored by one or more storage devices, such as one or more computer or machine-readable mediums (for example, the memory, or memory on the processor). The instructions can include instructions for performing decoding (i.e., the software modules include the audio codecs for decoding the digital audio streams), as well as digital signal processing and equalization.

Example Pairing and Mode Switch Without User Application Input

Aspects of the present disclosure provide techniques for pairing, at a target device with a partner device. In one example, the target device receives user input to enter a preparation mode. The target device may present to a source device that the target device is a discoverable device (e.g., in a discoverable mode) upon entering the preparation mode. In addition, the target device scans for a partner device, if any. Upon detecting at least one partner device, the target device may pair with the detected at least one partner device via a near-field communication network, such as a Bluetooth network.

Figure 2:
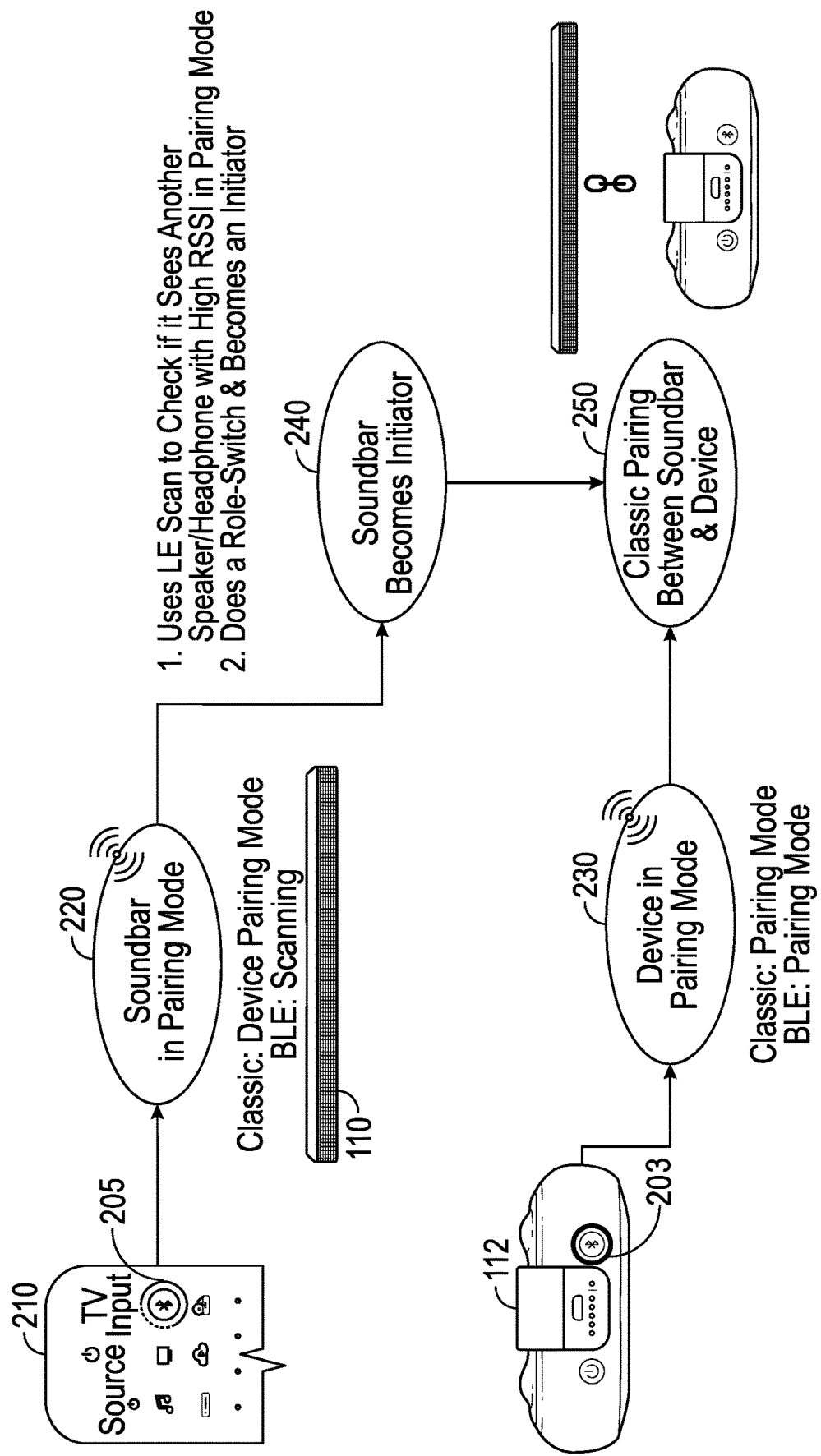
FIG. 2 illustrates an example pairing workflow without an application interface, in accordance with certain aspects of the present disclosure.

FIG. 2 illustrates an example pairing workflow without an application interface, in accordance with certain aspects of the present disclosure. As shown, the target device 110, illustrated as a sound bar, may be controlled via a remote controller 210. A user may activate the preparation mode in the target device 110 by pressing the preparation mode button 205 on the remote controller 210. In response, the target device 110 enters the preparation mode (e.g., pairing mode) at 220. In some cases, when the target device 110 is in the preparation mode, the target device 110 may use two or more different wireless protocols. For example, the target device 110 may behave as a passive discoverable device according to Bluetooth classic protocols and behave as an initiator when scanning for a partner device 112 according to Bluetooth low energy protocols. Upon detecting a partner device 112, the target device 110 may role-switch to become an initiator at 240, according to Bluetooth classic protocols. The target device 110 may then pair with the partner device 112 at 250.

In aspects, for power saving reasons, the partner device 112 may not always be discoverable by the target device 110. In some cases, a user may activate the partner device 112 to enter a pairing mode by pressing the button 203 on the partner device 112. Upon activation, the partner device 112 may be in pairing mode at 230, according to at least one of Bluetooth classic or Bluetooth low energy protocols. At 250, the partner device 112 may behave as an acceptor to pair with the target device 250. In aspects, the partner device 112 may stay in the pairing mode whenever the partner device 112 is powered on, such that the user need not separately activate the pairing mode for the partner device 112.

In aspects, upon pairing with the target device 110, the partner device 112 may playback data signals received from the target device 110. For example, the partner device 112 may play audio together with, or in the place of, the target device 110.

Example Pairing and Mode Switch With User Application Input

Aspects of the present disclosure provide techniques for a user device, such as the source device 120 of FIG. 1, to establish wireless communication between at least two devices, such as the target device 110 and the partner device 112 of FIG. 1. In one example, the user device runs a monitoring application configured to monitor a connection status between the user device and a first device, such as the target device 110. The user device identifies a second device available to be connected with the first device in a near-field communication network. For example, the user device may identify a partner device 112 of FIG. 1 via the target device 110, such as when the target device 110 scans and detects the partner device 112.

Upon identifying the second device, the user device notifies the user regarding the second device and the associated availability for connection with the first device. For example, the user may receive a push notification in the monitoring application of the user device. The push notification may include one or more second devices available for connection with the first device. The user device, after receiving a response from the user, provides at least one feedback instruction to the first device regarding the availability for connection of the second device. For example, the feedback instruction may indicate the first device is to connect with the second device in the near-field communication network.

Figure 3:
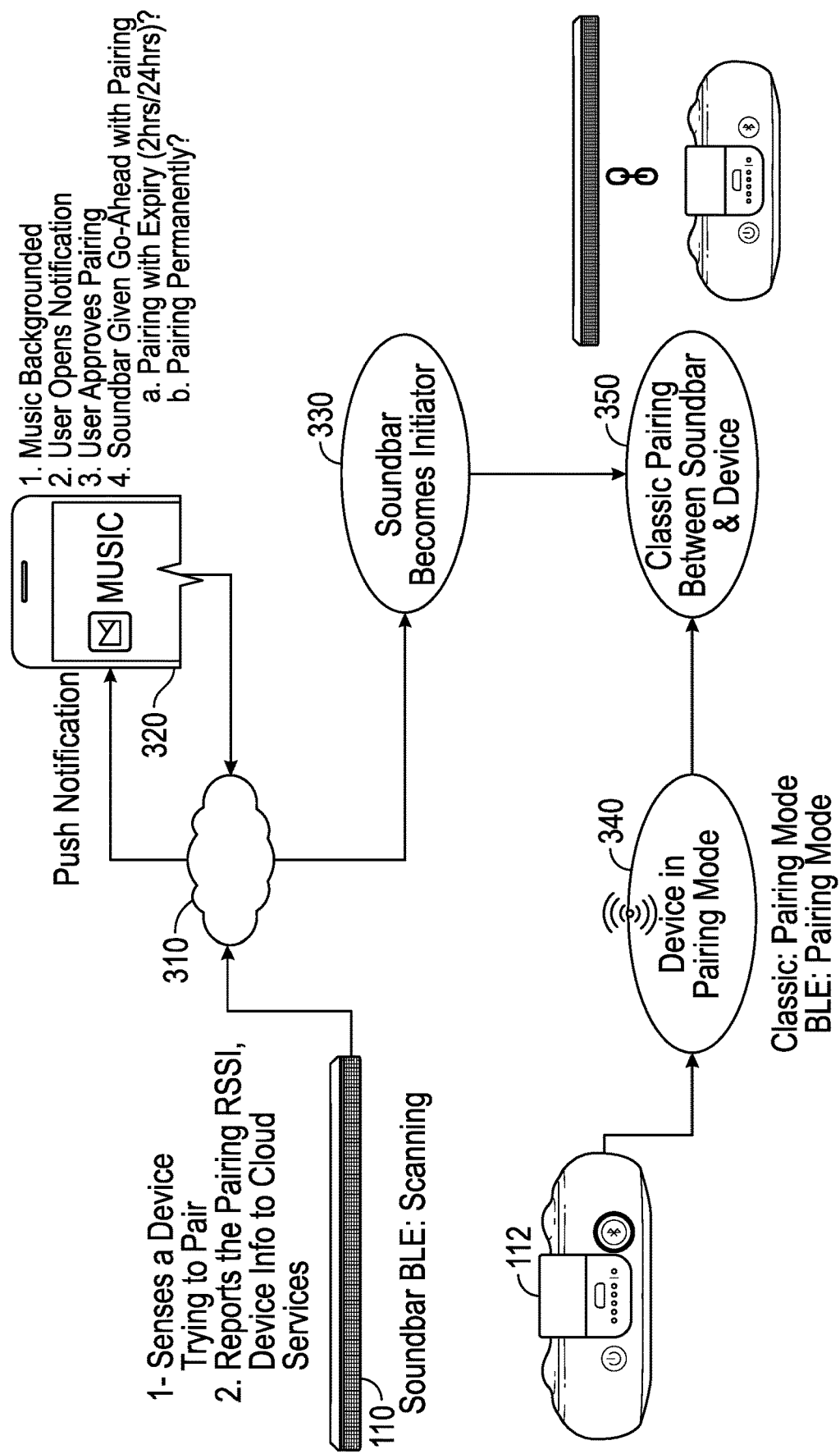
FIG. 3 illustrates an example pairing workflow with an application interface, in accordance with certain aspects of the present disclosure.

FIG. 3 illustrates an example pairing workflow with an application interface, in accordance with certain aspects of the present disclosure. As shown, the target device 110 may be connected with and report to the user device 320 via a near-field network 310. The user device 320 runs a monitoring application as well as other applications that may playback multimedia content on the target device 110. The user device 320 may represent a single device or a group of user devices 320 that allow a user to install the monitoring application therein. During operation, at 340, the partner device 112 enters into a pairing mode and is detected by the target device 110. The detection is monitored by the user device 320 via the connection between the target device 110 and the user device 320 via the network 310. At 330, the target device 110 becomes an initiator for pairing with the partner device 112. For example, the monitoring application on the user device 320 may notify the user regarding the availability of the partner device 112 and allows the user to choose whether or not to connect to the partner device 112. Upon receiving an affirmative response from the user, the target device 110 pairs with the partner device, such as according to Bluetooth classic protocols.

In some cases, the user may select a pairing duration for the target device 110 and the partner device 112, such that the pairing may expire after a period of time. The period of time may include preset durations in terms of hours (e.g., 1, 2, 4 hours) or may be set to indefinite until cancellation. In some cases, the selection of the pairing duration and the approval or indication for the pairing procedure by the user may be the same action. For example, when the user selects a specific pairing duration and confirms, such action approves the pairing operations between the target device 110 and the partner device 112.

Methods and Processes for Pairing and Mode Switch

Figure 4:
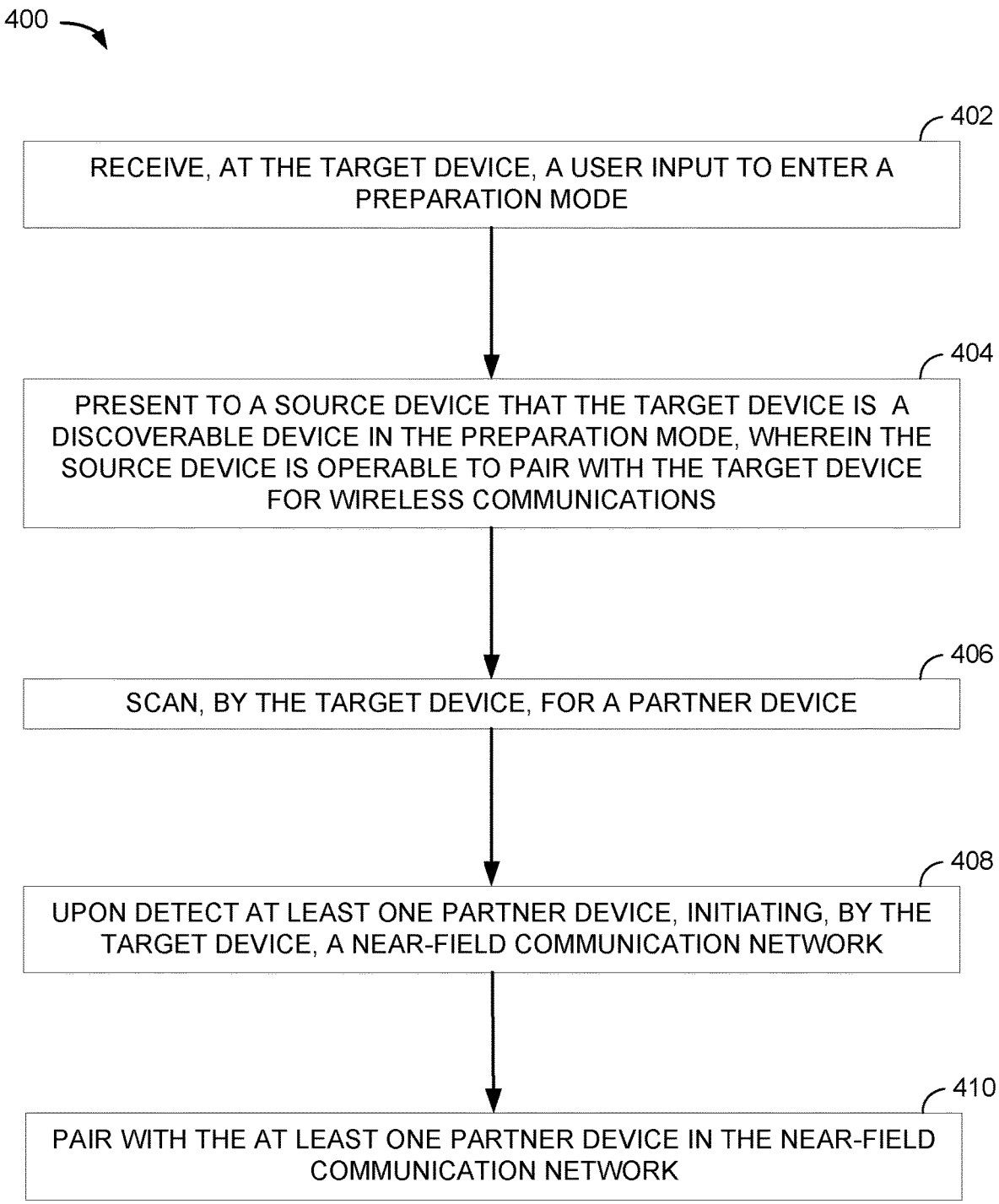
FIG. 4 is a flow diagram illustrating example operations that may be performed by a target device, in accordance with certain aspects of the present disclosure.

FIG. 4 is a flow diagram illustrating example operations 400 that may be performed by a target device for establishing wireless communications with other devices. For example, the example operations 400 may be performed by the target device 110 of FIG. 1.

The example operations 400 begin, at 402, receiving, at the target device, a user input to enter a preparation mode. At 404, the target device presents to a source device that the target device is a discoverable device in the preparation mode, wherein the source device is operable to pair with the target device for wireless communications. At 406, the target device scans for a partner device. Upon detecting at least one partner device, the target device initiates, at 408, a near-field communication network. At 410, the target device pairs with the partner device in the near-field communication network.

In aspects, the target device may scan for the partner device by performing the scanning according to Bluetooth Low Energy protocols.

In aspects, the user input is associated with a movement of the user. For example, the movement of the user contacts the target device, such as pressing a control button on the target device. In some cases, the user input may be provided to the target device without physical contact, such as by detecting the movement via a motion sensor, such as an infrared sensor, an accelerator, an inertia-measurement-unit, or the like. In some cases, the user input may be provided via a remote control, such as the remote control 210 of FIG. 2.

In aspects, the partner device may be configured to enter a discoverable mode (or discoverable state) to be scanned by the target device. For example, similar to the target device receiving the user input, the partner device may also receive a user input associated with a movement of the user to enter the discoverable mode.

In aspects, the target device may terminate the scanning by the target device when no partner device is detected within a timeout period. For example, the timeout period may be predefined in the internal program of the target device. In some cases, the timeout period may be specified by the user.

In aspects, the target device, upon detecting two or more partner devices, may determine which one or more of the two or more partner devices to pair with, based on properties of the two or more partner devices provided to the target device during the detection. For example, the properties of the two of more partner devices include functionalities associated with sound playing or sound sampling. The target device may automatically determine one of the two or more partner devices having similar functionalities as the target device for connection. When the target device is a sound bar, for example, the target device may select other sound playback devices. On the other hand, when the target device is a microphone, the target device may select another sound sampling device to assist or to replace the operations in the target device.

In aspects, the target device may pair with the at least one partner device in the near-field communication network by transmitting information received from the source device when the target device and the source device are paired. For example, the target device and the source device may have previously been paired prior to the target device entering the preparation mode. In some cases, the target device may maintain the existing connection with the source device. In some cases, the target device may be discovered by another source device and receive indication to handover the connection to the new source device.

In aspects, upon detecting the at least one partner device, the target device may cease to be in a discoverable state and becomes an initiator to pair with the at least one partner device.

Figure 5:
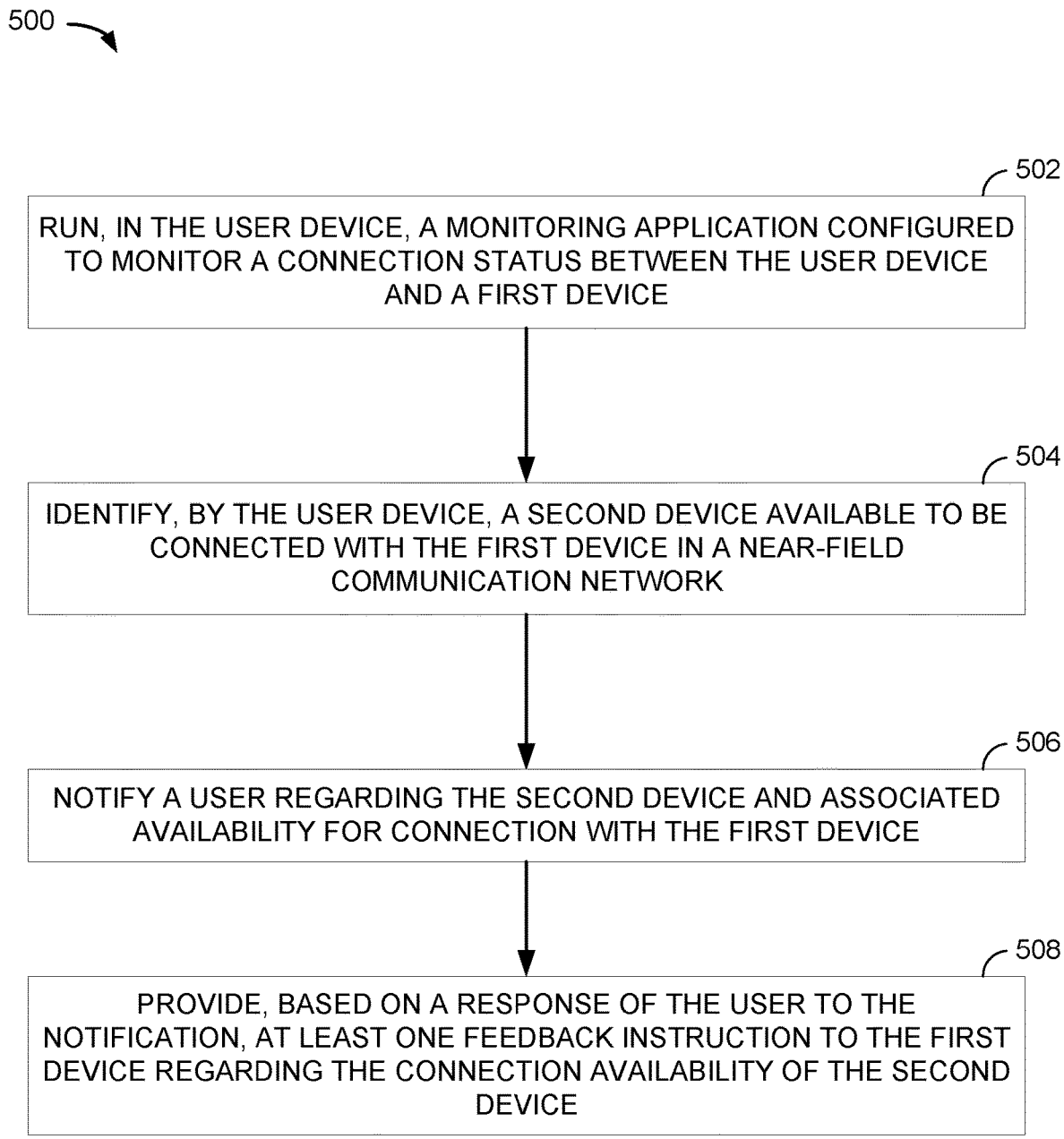
FIG. 5 is a flow diagram illustrating example operations that may be performed by a user device, in accordance with certain aspects of the present disclosure.

FIG. 5 is a flow diagram illustrating example operations 500 that may be performed by a user device for establishing wireless communications between at least two devices. For example, the example operations 500 may be performed by the source device 120 of FIG. 1.

The example operations 500 begin, at 502, by running, in the user device, a monitoring application configured to monitor a connection status between the user device and a first device. At 504, the user device identifies a second device available to be connected with the first device in a near-field communication network. At 506, the user device notifies a user regarding the second device and associated availability for connection with the first device. At 508, the user device provides, based on a response of the user to the notification, at least one feedback instruction to the first device regarding the availability for connection of the second device.

In aspects, the user device may monitor a received signal strength indicator (RSSI) reported by the first device and notifying the user when the RSSI reported drops below a threshold value. When the RSSI drops below the threshold value, the user device may notify the user such that alternative, more reliable connection options may be used.

In aspects, the user device may identify the second device by receiving, from the first device, a detection report by the first device of the second device. For example, the user device may utilize scanning results of the first device, in addition to or in the place of, scanning for the second device. In some cases, the first device scans for the second device absent user input. The first device may scan for the second device using Bluetooth Low Energy protocols.

In aspects, the user device may further provide, upon receiving an approval response from the user, a number of options regarding a timeout period for the connection between the first device and the second device for user selection. For example, the number of options may include a permanent paring option.

In aspects, the second device may be triggered by the user to be available to be connected with the first device. For example, the second device may receive a user input, according to various manners aforementioned.

In aspects, the user device may play media content on the second device after the first device has been connected with the second device. For example, the first device may relay content data to the second device. In some cases, the first device may enable a direct data link between the user device and the second device after the connection.

In other aspects, the disclosed methods are applicable to wireless earbuds, earhooks, or ear-to-ear devices. For example, a host like a mobile phone may be connected over Bluetooth to a bud (e.g., right side) and that right-side bud further connects to the left-side bud using either a Bluetooth link or using other wireless technologies like NFMI or NFEMI. The left-side bud is first time-synchronized with the right-side bud. Audio frames (compressed in mono) are sent from the left-side bud with its timestamp (which is synchronized with the right bud's timestamp) as described in the technology above. The right bud will forward these encoded mono frames along with its own frames. The right bud will not wait for an audio frame from the left bud with the same timestamp. Instead, the right-bud sends whatever frame is available and ready to be sent with suitable packing. It is the responsibility of the receiving application in the host to assemble the packets using the timestamp and the channel number. The receiving application, depending upon how it is configured, can choose to merge the decoded mono channel of one bud and a decoded mono channel of the other bud into a stereo track based on the timestamp included in the header of the received encoded frames. The present disclosure allows the right-side bud to simply forward the audio frames from the left-side bud without decoding the frame. This helps to conserve battery power in truly wireless audio devices.

In some aspects, the techniques variously described herein can be used to improve virtual personal assistant (VPA) functionality. For instance, the techniques described herein can improve wake-up word (WuW) support for one or more VPAs (such as Google Assistant, Amazon's Alexa, Apple's Siri, Samsung's Bixby, Microsoft's Cortana, Tencent's Xiaowei, Huawei's Celia, and so forth). For example, in some such aspects, the techniques described herein enable offloading of WuW processing from the source device (e.g., headphones, earbuds, or some other wearable device) to the target device (e.g., a smartphone, tablet computer, or other device with relatively more processing capabilities). This can provide a benefit to implementing WuW functionality (for VPAs or other applications), as WuW processing may be large in size and/or use intensive computing resources such that a relatively more capable processing device (such as a smartphone) can provide better support for the WuW processing. In addition, by offloading the WuW processing from the source device to the target device, enabling multiple simultaneous WuW support (e.g., for two or more VPAs). This can benefit the user by allowing the best VPA to be used for a desired use case, either manually (e.g., by using the specific WuW to access the desired VPA) or automatically (e.g., by having a single WuW that routes the VPA request to the VPA service that can best handle the inquiry/request). For example, a VPA request to Amazon's Alexa (manually made by saying "Alexa" or automatically made via a custom WuW) may be used to play music while a VPA request to Google Assistant (manually made by saying "Hey Google" or automatically made via the custom WuW) may be used to schedule a calendar meeting. This can also lead to easier VPA WuW support certification, as the VPA service's software can be run on the target device as opposed to using the source device's software to detect and process WuWs. Further, the WuW support can be standardized across multiple different target devices to support multiple different source devices.

In some aspects, the techniques variously described herein can be used to determine contextual information for a source device and/or the user of the source device. For instance, the techniques can be used to help determine aspects of the user's environment (e.g., noisy location, quiet location, indoors, outdoors, on an airplane, in a car, etc.) and/or activity (e.g., commuting, walking, running, sitting, driving, flying, etc.). In some such aspects, various data received from the source device can be processed at the target device to determine such contextual information and provide new or enhanced experiences to the user. For example, this could enable playlist or audio content customization, noise cancellation adjustment, and/or other settings adjustments (e.g., audio equalizer settings, volume settings, notification settings, etc.), to name a few examples. As source devices (e.g., headphones or earbuds) typically have limited resources (e.g., memory and/or processing resources), using the techniques described herein to offload the processing of data from sensors of the source device(s) to a target device while having a system to synchronize data at the target device provides a variety of applications. In some aspects, the techniques disclosed herein enables the user device to automatically identify an optimized or a most favorable configuration or setting for the synchronized audio capture operations.

In some aspects, the techniques variously described herein can be used for a multitude of audio/video applications. For instance, the techniques can be used for stereo or surround sound audio capture from a source device to be synchronized at a target device with video captured from the same source device, another source device, and/or the target device. For example, the techniques can be used to synchronize stereo or surround sound audio captured by microphones on a pair of headphones with video captured from a camera on or connected to the headphones, a separate camera, and/or the camera of a smartphone, where the smartphone (which is the target device in this example) performs the synchronization of the audio and video. This can enable real-time playback of stereo or surround sound audio with video (e.g., for live streaming), capture for recorded videos with stereo or surround sound audio (e.g., for posting to social media platforms or news platforms). In addition, the techniques described herein can enable wireless captured audio for audio or video messages without interrupting a user's music or audio playback. Thus, the techniques described herein enable the ability to produce immersive and/or noise-free audio for videos using a wireless configuration. Moreover, as can be understood based on this disclosure, the techniques described enable schemes that were only previously achievable using a wired configuration, so the techniques described free the user from the undesirable and uncomfortable experience of being tethered by one or more wires.

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware aspect, an entirely software aspect (including firmware, resident software, micro-code, etc.) or an aspect combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A method performed by a target audio output device for establishing wireless communications with partner audio output devices, the method comprising:
   receiving, at the target audio output device, a user input to enter a pairing mode;
   presenting to a computing device, paired with the target audio output device, that the target audio output device is a discoverable device in the pairing mode;
   scanning, by the target audio output device in the pairing mode, for one partner audio output device of the partner audio output devices;
   upon detecting at least one partner audio output device of the partner audio output devices, initiating, by the target audio output device, a near-field communication network with the partner audio output device; and
   pairing with the partner audio output device in the near-field communication network.

2. The method of claim 1, wherein the scanning by the target audio output device for the partner audio output device comprises performing the scanning according to Bluetooth Low Energy protocols.

3. The method of claim 1, wherein the user input is associated with a movement of the user.

4. The method of claim 3, wherein the movement of the user contacts the target audio output device.

5. The method of claim 1, wherein the partner audio output device is configured to enter a discoverable mode to be scanned by the target audio output device.

6. The method of claim 1, further comprising terminating the scanning by the target audio output device when no partner audio output device is detected within a timeout period.

7. The method of claim 1, further comprising, upon detecting two or more partner audio output devices, determining which one or more of the two or more partner audio output devices is to be paired, based on properties of the two or more partner audio output devices provided to the target audio output device during the detection.

8. The method of claim 7, wherein the properties of the two of more partner audio output devices include functionalities associated with sound playing or sound sampling.

9. The method of claim 1, wherein pairing with the at least one partner audio output device in the near-field communication network comprises transmitting information received from the computing device when the target audio output device and the computing device are paired.

10. The method of claim 9, wherein the target audio output device and the computing device have previously been paired prior to the target audio output device entering the pairing mode.

11. The method of claim 1, further comprising:
    ceasing to be in a discoverable state upon detecting the at least one partner audio output device; and
    becoming an initiator operable to pair with the at least one partner audio output device.

12. An apparatus for establishing wireless communications with other devices by a target audio output device, comprising:
    a memory; and
    one or more processors coupled to the memory, the memory and the one or more processors being configured to:
    receive, at the target audio output device, a user input to enter a pairing mode;
    present to a computing device, paired with the target audio output device, that the target audio output device is a discoverable device in the pairing mode;
    scan, by the target audio output device in the pairing mode, for one partner audio output device of the partner audio output devices;
    upon detecting at least one partner audio output device of the partner audio output devices, initiate, by the target audio output device, a near-field communication network with the partner audio output device; and
    pair with the partner audio output device in the near-field communication network.

13. The apparatus of claim 12, wherein the memory and the one or more processors are configured to cause the apparatus to scan, by the target audio output device, for the partner audio output device by performing the scanning according to Bluetooth Low Energy protocols.

14. The apparatus of claim 12, wherein the user input is associated with a movement of the user.

15. The apparatus of claim 14, wherein the movement of the user contacts the target audio output device.

16. The apparatus of claim 12, wherein the partner audio output device is configured to enter a discoverable mode to be scanned by the target audio output device.

17. The apparatus of claim 12, wherein the memory and the one or more processors are further configured to terminate the scanning by the target audio output device when no partner audio output device is detected within a timeout period.

18. The apparatus of claim 12, wherein the memory and the one or more processors are further configured to, upon detecting two or more partner audio output devices, determine which one or more of the two or more partner audio output devices is to be paired, based on properties of the two or more partner audio output devices provided to the target audio output device during the detection.

19. The apparatus of claim 18, wherein the properties of the two of more partner audio output devices include functionalities associated with sound playing or sound sampling.

20. The apparatus of claim 12, wherein the memory and the one or more processors are configured to cause the apparatus to pair with the at least one partner audio output device in the near-field communication network by transmitting information received from the computing device when the target audio output device and the computing device are paired.

* * * * *